UNITED STATES PATENT OFFICE 3,410,335
Patented Nov. 12, 1968

3,410,335
COOLERS FOR MIXTURES OF GASES AND SOLID PARTICLES
Lennart Hugo Malmström and Carl Olof Malmström, Norrkoping, Sweden, assignors to Svenska Carbon Black Aktiebolag Sjotullsgatan, Norrkoping, Sweden, a Swedish company
Filed Jan. 4, 1967, Ser. No. 607,299
Claims priority, application Sweden, Jan. 7, 1966, 184/66
7 Claims. (Cl. 165—1)

ABSTRACT OF THE DISCLOSURE

A tubular cooler for mixtures of gases and solid particles (e.g. carbon black) has reciprocating scrapers in the tubes to prevent deposition of the solid particles. The scrapers are reciprocated by a shaft passing through a hole in the roof of the cooler. Escape of gas and solid particles through this hole is prevented through the provision of a liquid seal formed by a bell-shaped plate fixed to the shaft which clips into an annular chamber fixed to the roof and filled with liquid (e.g. mercury). The depth of liquid in the chamber is such that the bell-shaped plate is at least partly immersed throughout the stroke of the shaft.

---

This invention relates to coolers for mixtures of gases and solid particles, particularly the products of carbon black producing processes.

The cooling of mixtures of gases and solid particles, particularly the cooling of the mixtures from high temperatures of 600° C. or more to temperatures below 300° C., is a matter of considerable commercial interest particularly in the production of carbon black by the furnace process. The present practice is to cool the gas-solids mixture by direct injection of water. While this gives the required cooling quickly it has a number of important drawbacks. For example, the solid particles are wetted and usually have to be dried again before collection. Corrosion of the apparatus downstream of the cooler is also increased. Further the gases become admixed with large quantities of water vapour, which reduce their value as fuel gas. But perhaps most importantly of all, the water vapour tends to react with the carbon black particles to form water gas and reduce the overall yield of carbon black. To overcome these drawbacks, it has been proposed to cool the mixtures by indirect heat exchange, but the difficulty with this method is the fact that the solid particles are deposited on the walls of the heat exchanger and quickly reduce the heat transfer through the walls.

To prevent the build-up of deposits on the walls of a tubular cooler, the specification of Swedish patent application No. 1897/65 and its companion U.S. application Ser. No. 525,988, filed Feb. 8, 1966 (now U.S. Patent No. 3,384,161 granted May 21, 1968), proposes a tubular cooler for mixtures of gases and solid particles comprising one or more tubes through which the mixture can pass, means for cooling the outside of the tube, and a scraper fitting inside the tube which contacts the tube wall but allows free passage of gas and particles through the tube and which is capable of reciprocating axially in the tube, said scraper being in contact with the tube wall at a number of equally spaced points and being capable of being reciprocated with a stroke at least equal to the distance between the equally spaced points.

The moving scraper must be driven from a point outside the cooler and hence a moving shaft has to pass through an aperture in a wall of the cooler. There is a particular problem in making this aperture gas tight since the seal has to be able to withstand both constant movement and temperatures of the order of 300° C.

Accordingly the present invention consists of a vertical tubular cooler for mixtures of gases and solid particles comprising one or more tubes through which the mixture can pass, means for cooling the outside of the tube, and a scraper fitting inside the tube which contacts the tube wall but allows free passage of gas and particles through the tube and which is capable of reciprocating axially in the tube, said scraper being in contact with the tube wall at a number of equally spaced points and being capable of being reciprocated with a stroke at least equal to the distance between the equally spaced points, and being driven by a shaft passing through an aperture in the roof of the cooler, characterised in that the shaft has a bell-shaped plate fixed to it which dips into an annular chamber, surrounding the shaft, fixed on the outside of the cooler roof said chamber being filled with liquid to a depth such that at least a part of the plate is immersed in the liquid throughout the whole stroke of the shaft.

The annular chamber, the depth of liquid in it and the skirt of the bell-shaped plate are desirably at least equal to the stroke of the scraper and shaft. However, particularly if the scarper and shaft have a long stroke, the skirt may consist of two or more telescoping parts which are drawn out during the upward part of the stroke and telescoped together during the downward part of the stroke. Stops on the parts may be used to control and draw out the parts during the upward movement. On the downward movement, stops may again be used to bring the parts together, and the outer part may be loaded with a spring tending to force it downwards.

Any liquid may be used which is not volatile at the temperature of operation which may be as high as 300° C. Preferably the liquid is a liquid metal, for example mercury, but liquid hydrocarbons, for example petroleum fractions boiling above 300° C., may also be used.

Regarding the cooler itself, this preferably has a number of tubes arranged in a bank. Depending on the size of the cooler the number of tubes in the bank may be from 10 to 100. Preferably the tube or bank of tubes are surrounded by an enclosed shell having an inlet and outlet for cooling fluid. Cooling by a liquid, such as water, is preferred, but cooling of at least a portion of the length of the tubes by a gas is not excluded. Where gas cooling is used, the outside of the tubes are preferably finned or have some other form of extended surface.

The invention is illustrated without being limited by the accompanying drawings in which.

Figure 1:
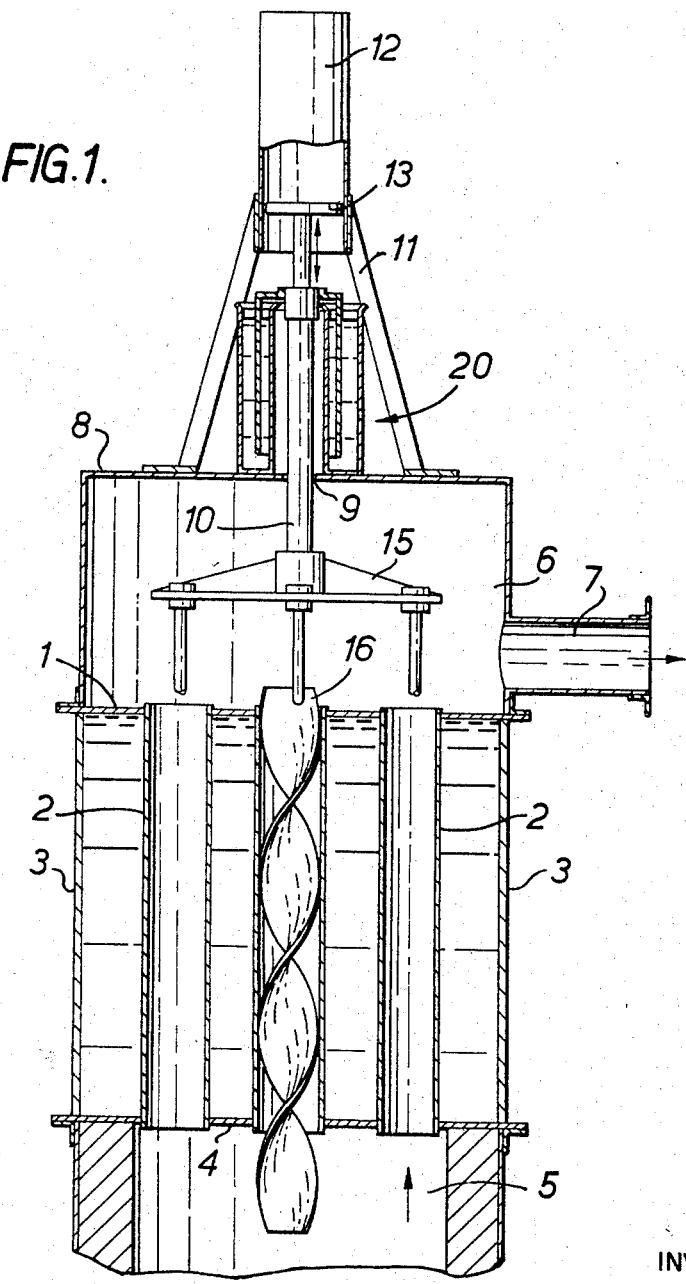
FIGURE 1 shows a tubular cooler according to the present invention.

In FIGURE 1 a tube cooler has a number of parallel, straight, vertical tubes 2. These are fixed into two parallel end plates 1, 4, which are fixed over the ends of a preferably cylindrical casing 3, which is arranged so that a cooling fluid, preferably water, flows through it via an inlet and outlet (not shown).

The lower end plate 4 is connected to a chamber 5, through which hot gas containing solid particles is supplied to the tubes 2, and the upper end plate 1 is connected to a chamber 6, from which the cooled gas and particles exit through a connecting branch 7. The chamber 6 is closed at its upper end by a roofing slab 8, which has a central opening 9.

A rod 10 is arranged to pass through the opening 9 with slight play. A support 11, resting on the roofing slab 8, holds the upper end of rod 10 in such a way that it is free to reciprocate longitudinally.

In the design shown this arrangement consists of a piston 13 axially movable in a cylinder 12, by fluid pressure applied alternately to either side. The arrangement in question can naturally be designed in many other ways, e.g. as a crank and connecting rod.

The rod 10 is fastened at its lower end to a transverse plate 15, from which scrapers 16, are suspended passing through each of the tubes 2. The scrapers consist of a helically wound flat steel bar 16 and the stroke of the piston 13 is at least equal to the length of the helix of the bar 16. However, the scrapers may consist of screw-shaped bent plates fixed to a central rod or they may consist of scraping rings fixed to a central rod for example by means of hubs and spokes.

Figure 2:
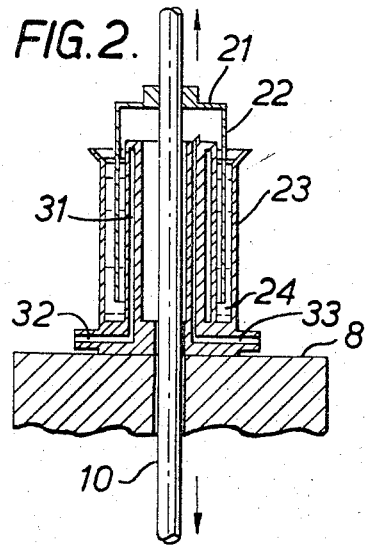
FIGURE 2 shows the liquid seal of FIGURE 1 on an enlarged scale.

The opening 9 is made gas tight by a liquid seal indicated generally at 20 and shown in more detail in FIGURE 2. In FIGURE 2, there is an annular chamber 23 on the roof slab 8. Chamber 23 is open at the top, has a depth somewhat greater than the stroke length of the rod 10 and is almost filled with mercury 24.

A bell 21 fixed on the rod 10 is provided with a skirt 22 projecting down into the mercury and is fitted in such a way that part of the skirt 22 is underneath the surface of the mercury during the entire stroke.

In order to reduce the evaporation of the mercury 24 the annular chamber 23 may be provided with a cooling arrangement, for example an internal casing 31 provided with inlet 32 for a water supply. There will also be an exit (not shown) to allow water to circulate.

In order to prevent particles from being sucked up during the upward movement of the bell 21 into the bell 21 and in this way contaminating the mercury 24, there is a pipe 33 leading in suitably near to the top edge of the annular chamber 23 underneath the bell 21, through which particle-free gas can be introduced at a rate greater than the temporary enlargement of the bell volume.

Figure 3:
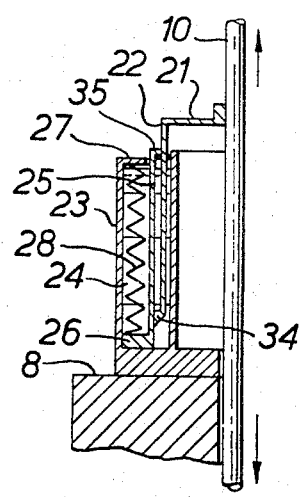
FIGURES 3 and 4 show alternative forms of the liquid seal with telescopic parts.

The embodiment described in FIGURE 3 differs from the one described in FIGURE 2 in that the skirt 22 of the bell 21 is provided with a telescopic extension 25, which at its lower end is provided with at least one projecting toe 26. Between this toe 26 and a projection 27 on the top edge of the outer wall of the annular chamber 23 there is fitted a spring 28, which exerts a downward force onto toe 26 and extension 25. There are also stops 34 and 35 at the lower and upper ends respectively of skirt 22 and extension 25. In operation, the upward movement of rod 10 draws up bell 21 and when stops 34 and 35 meet extension 25 is also drawn up compressing spring 28. When rod 10 is on its downward movement, spring 28 ensures that extension 25 returns to its lower position.

Figure 4:
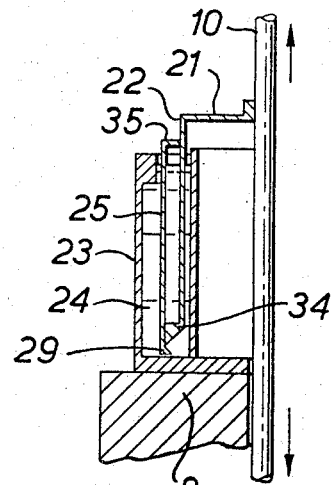

The embodiment described in FIGURE 4 differs from the one described in FIGURE 3 in that the lowering of the extension 25 into the mercury 24 during the downwards movement of the bell 21 is brought about by a projection 29 at the bottom edge of the extension 25, arranged so that during the downwards movement of the bell 21 it is acted upon by a projection 30 at the bottom edge of the bell 21.

Stops 34 and 35 may have, respectively, a tongue and groove to limit relative lateral or rotational movement between the bell 21 and the extension 25.

The apparatus described above may be used for cooling any mixture of gases and solid particles, and, although particularly suitable for cooling the products of a carbon black producing process, is not limited thereto. The invention thus includes a method of cooling mixtures of gases and solid particles comprising passing the mixture through one or more vertical tubes which are cooled externally and preventing the deposition of the solid particles on the internal walls of the tube by reciprocating a scraper axially within the tube, said scraper, while allowing free passage of gas and particles through the tube, being in contact with the wall of the tube at a number of equally spaced points, having a stroke at least equal to the distance between the equally spaced points, and being driven by a shaft passing through an aperture in the roof of the cooler, characterised in that the mixture is prevented from escaping through the aperture into the atmosphere by a liquid seal as described above.

Preferably the mixture of gas and solid particles is the product from a carbon black producing process. As is well known, carbon black is produced by the incomplete combustion of hydrocarbons with an oxygen containing gas, such as air, under turbulent conditions. The product mixture is thus carbon black in the form of very fine particles, together with a gas containing unburnt or partially burnt hydrocarbons, carbon oxides, hydrogen and nitrogen, if air is used as the combustion gas. The fine state of subdivision of the carbon black makes the product particularly suitable for cooling by the method and apparatus of the present invention and, as stated earlier, there are particular advantages resulting from the use of the present invention in carbon black manufacture in that the carbon black yield is increased, the carbon black is not wetted, corrosion downstream from the cooler is reduced by the absence of water vapour and the gaseous by products are more valuable.

As stated previously, the tube or tubes are placed vertically and preferably the mixture of gas and solid particles flows upwardly. The rate of flow of the mixture should be such that the solid particles are kept in suspension and pass out of the cooler with the gases for separation and collection at a later point.

The apparatus and method of the present invention are particularly suitable for use in combination with the invention described in applicants' Swedish patent application No. 3320/65.

We claim:

1. A vertical tubular cooler for mixture of gases and solid particles at least one tube through which the mixture can pass, means for cooling the outside of the tube, and a scraper fitting inside the tube which contacts the tube wall but allows free passage of gas and particles through the tube and which is capable of reciprocating axially in the tube, said scraper being in contact with the tube wall at a number of equally spaced points and being capable of being reciprocated with a stroke at least equal to the distance between the equally spaced points, and being driven by a shaft passing through an aperture in the roof of the cooler, characterised in that the shaft has a bell-shaped plate fixed to it which dips into an annular chamber, surrounding the shaft, fixed on the outside of the cooler roof said chamber being filled with liquid to a depth such that at least a part of the plate is immersed in the liquid throughout the whole stroke of the shaft.

2. A cooler as claimed in claim 1 wherein the liquid in the annular chamber is a liquid metal.

3. A cooler as claimed in claim 1 wherein the skirt of the bell-shaped plate is formed of two telescoping parts with stops enabling the parts to be drawn up in succession during the upward movement of the shaft.

4. A cooler as claimed in claim 3 wherein the outermost part of the skirt is spring loaded, being drawn up against the pressure of the spring and being lowered by the spring during the downward movement of the shaft.

5. A cooler as claimed in claim 3 wherein the telescoping parts have stops which enable the parts to be pushed down in succession during the downward movement of the shaft.

6. A cooler as claimed in claim 1 wherein the annular liquid-filled chamber has a cooling jacket.

7. A method of cooling mixtures of gases and solid particles comprising passing the mixture through at least one vertical tube which is cooled externally and preventing the deposition of the solid particles on the internal walls of the tube by reciprocating a scraper axially within the tube, said scraper, while allowing free passage of gas and particles through the tube, being in contact with the wall of the tube at a number of equally spaced points, having a stroke at least equal to the distance between the equally spaced points, and being driven by a shaft passing through an aperture in the roof of the cooler, characterised in that the mixture is prevented from escaping through the aperture into the atmosphere by a liquid seal formed from a bell-shaped plate fixed to the shaft, and an annular chamber, surrounding the shaft, fixed on the outside of the cooler roof and filled with liquid into which the plate dips so that at least a part of the plate is immersed in the liquid throughout the whole stroke of the shaft.

References Cited

UNITED STATES PATENTS

| | | | |
|---|---|---|---|
| 1,770,208 | 7/1930 | Kemnal | 165—95 |
| 1,931,706 | 10/1933 | Powell | 277—135 |
| 3,075,753 | 1/1963 | Akin | 285—11 |
| 3,115,347 | 12/1963 | Lennon | 277—135 |

ROBERT A. O'LEARY, *Primary Examiner.*

CHARLES SUKALO, *Assistant Examiner.*